June 3, 1952 E. G. WILSON 2,599,503
APPARATUS FOR THE TREATMENT OF
HIDES, SKINS, AND THE LIKE
Filed April 11, 1951 6 Sheets-Sheet 3
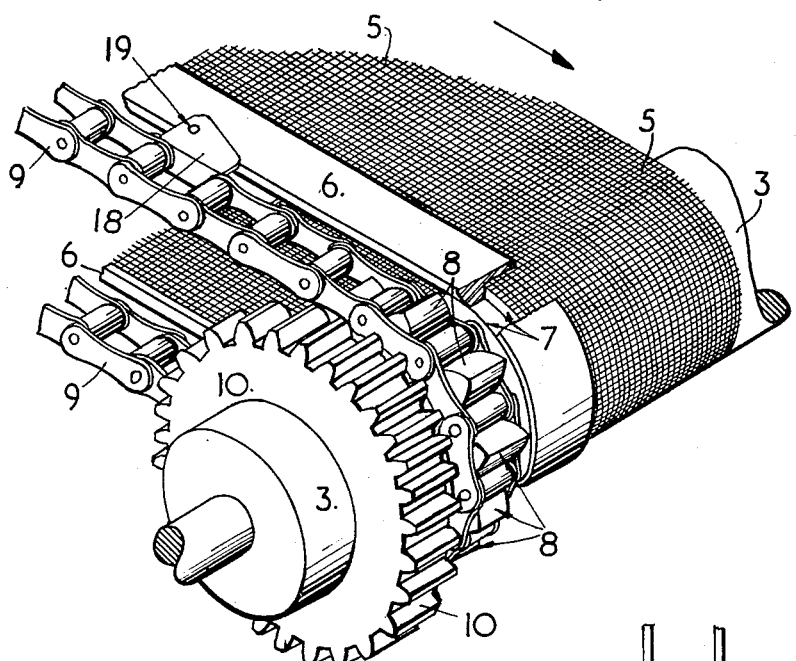
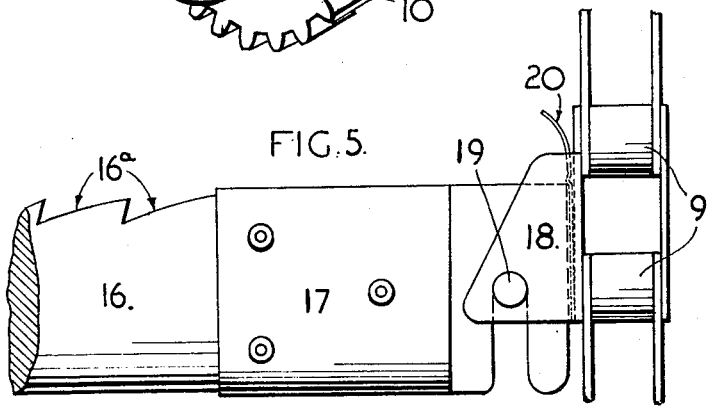
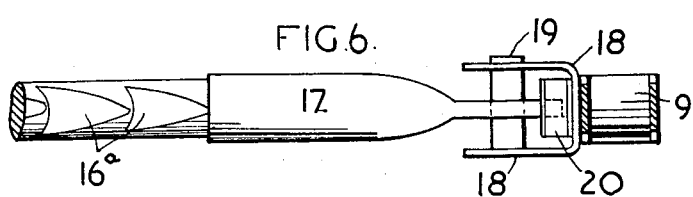
*Inventor*
EVAN GEORGE WILSON
By
*Linton and Linton*
Attorneys

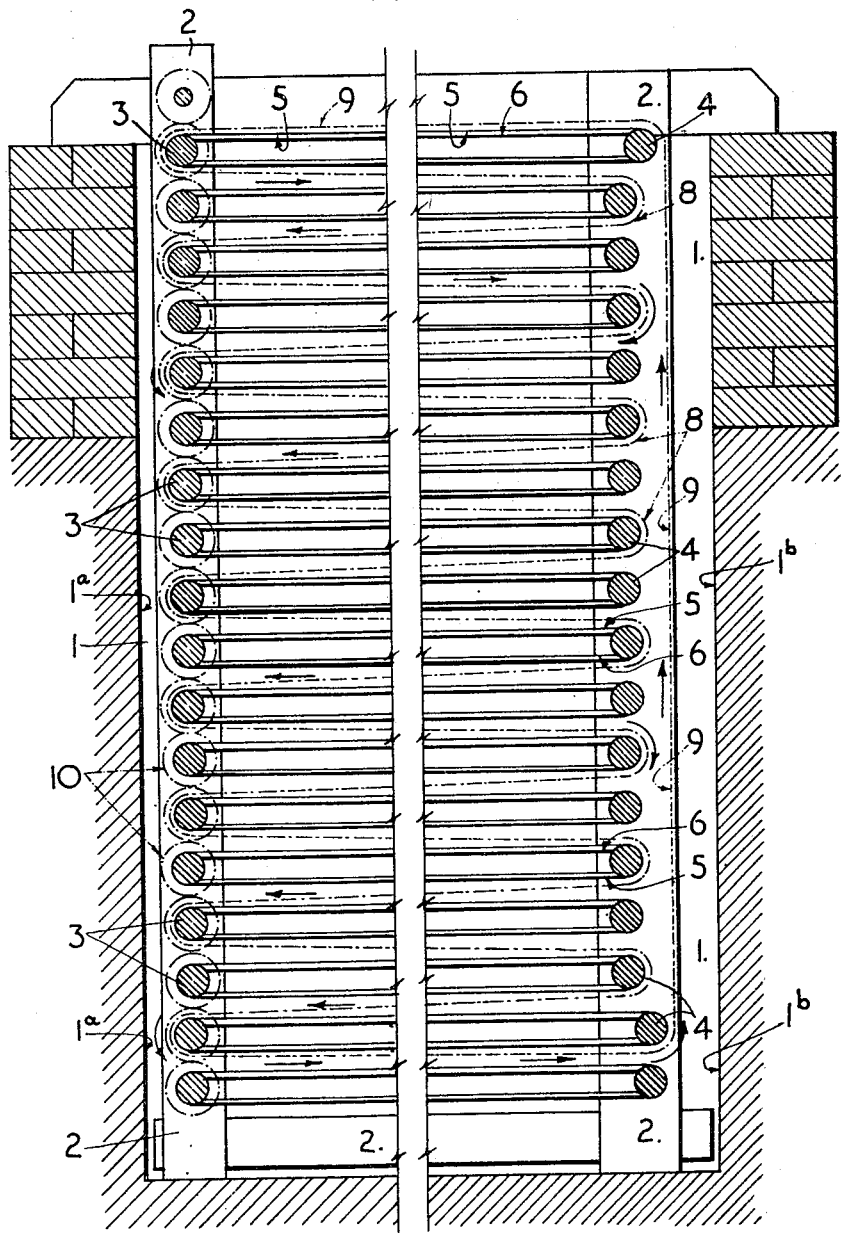

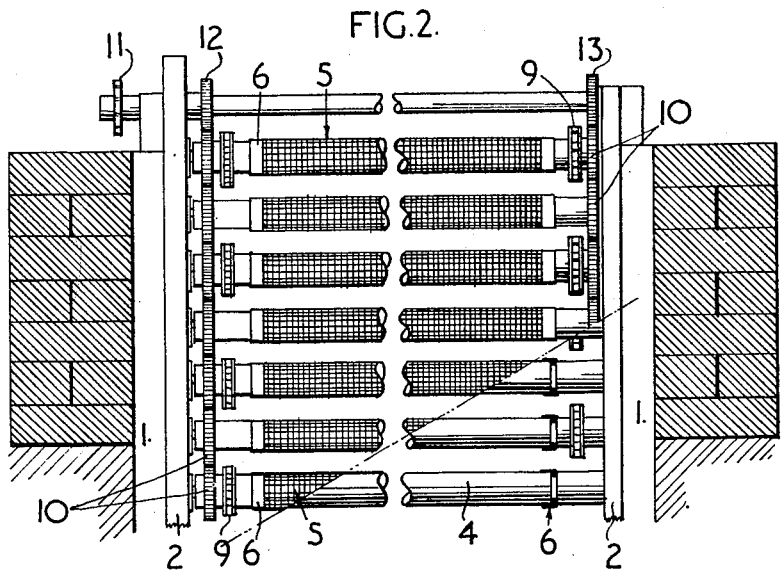
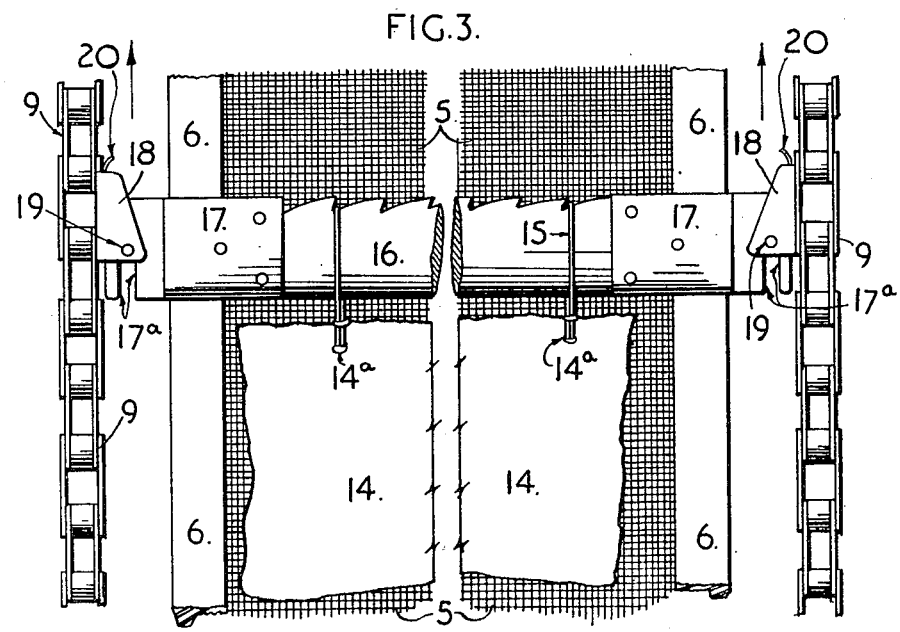

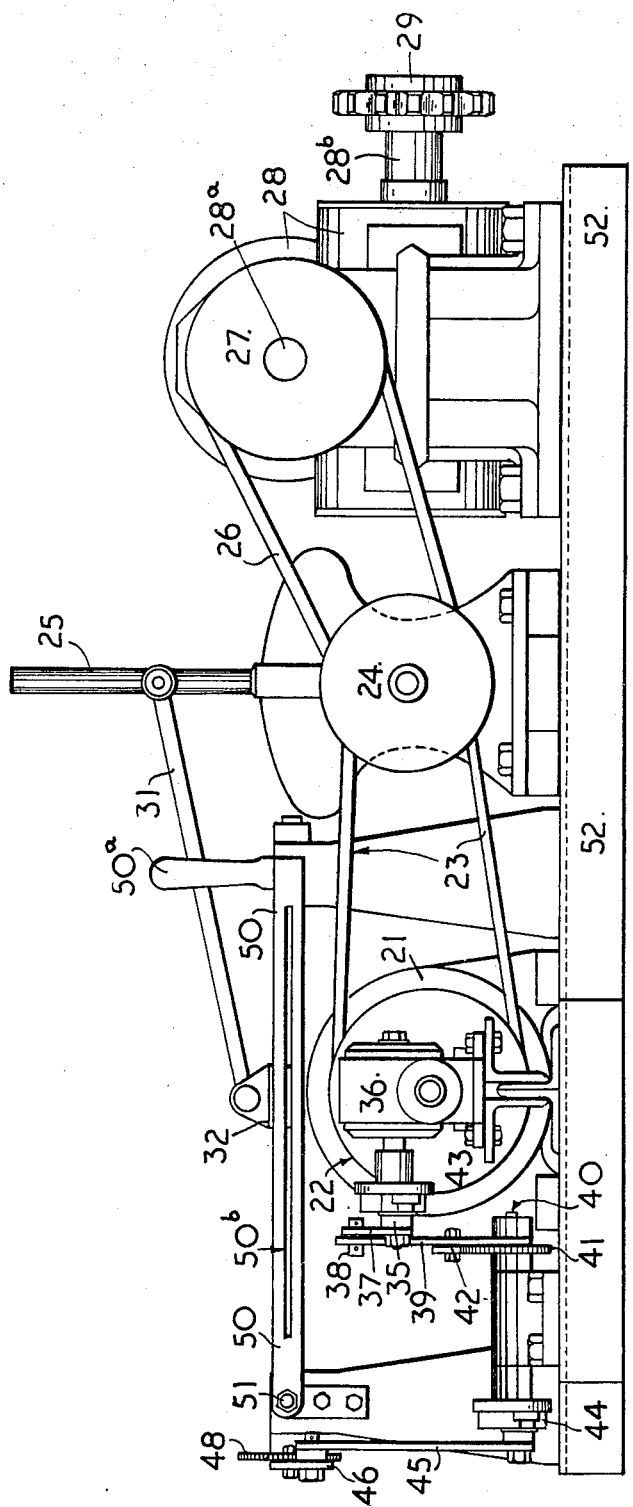

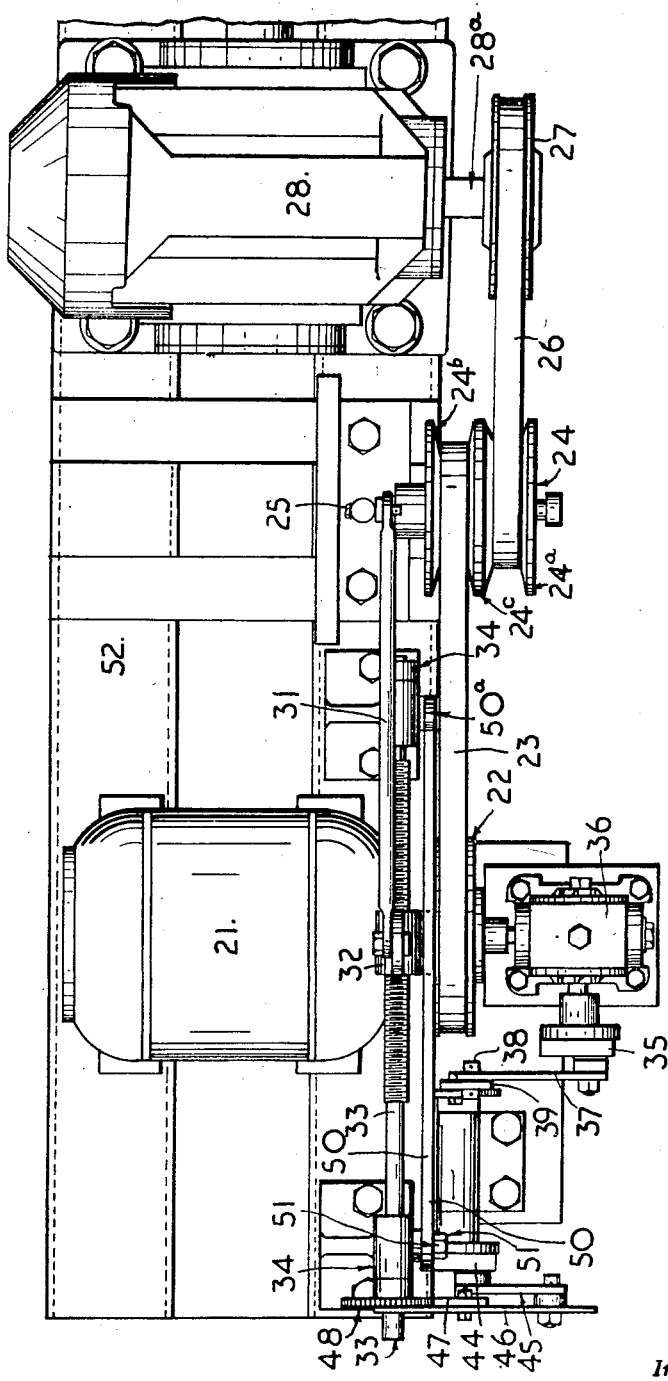

June 3, 1952 E. G. WILSON 2,599,503
APPARATUS FOR THE TREATMENT OF
HIDES, SKINS, AND THE LIKE
Filed April 11, 1951 6 Sheets-Sheet 6
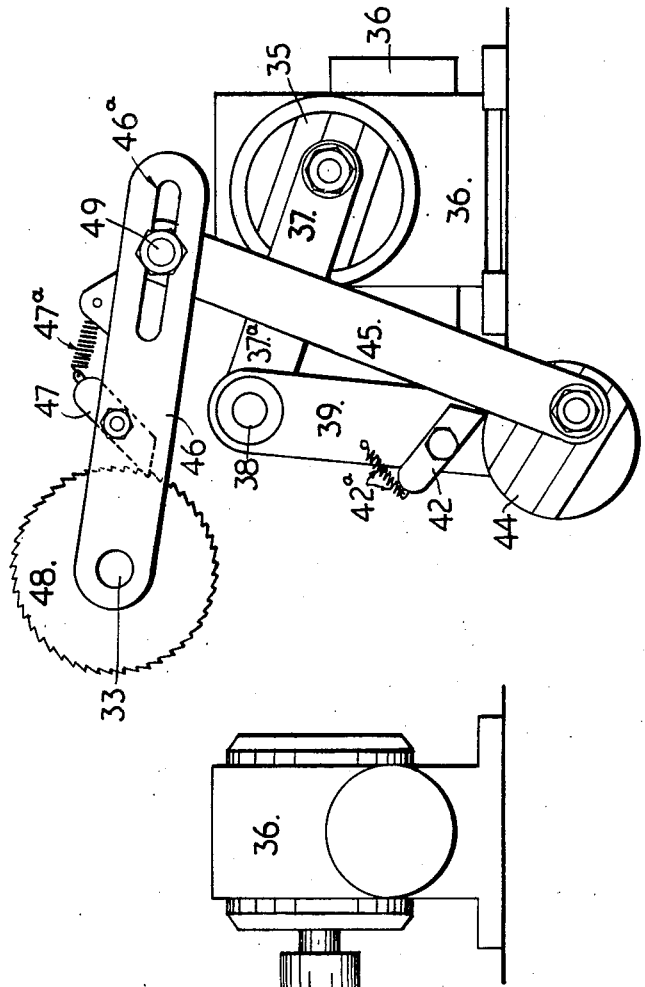
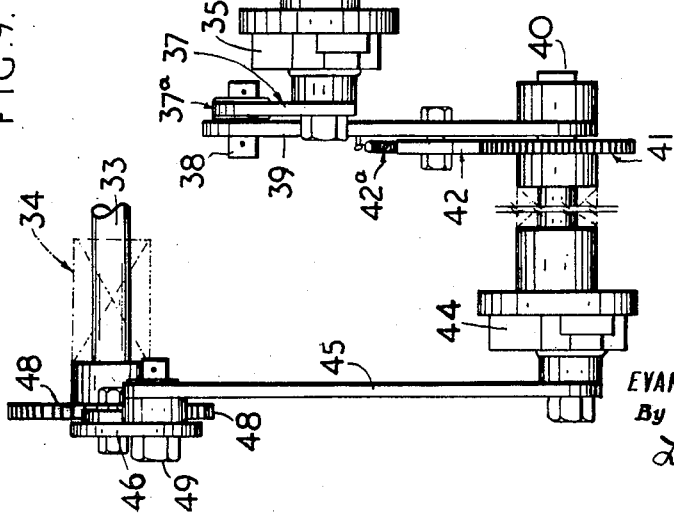
Inventor
EVAN GEORGE WILSON
By
Linton and Linton
Attorneys Patented June 3, 1952

2,599,503

UNITED STATES PATENT OFFICE 2,599,503

APPARATUS FOR THE TREATMENT OF HIDES, SKINS, AND THE LIKE

Evan George Wilson, Blundellsands, Liverpool, England

Application April 11, 1951, Serial No. 220,452
In Great Britain December 30, 1948

3 Claims. (Cl. 69—32)

This invention relates to new or improved apparatus for tanning hides, skins, and the like (all hereinafter referred to and included in the term "leathers"), and has for its object to expedite the tanning process and to enhance the quality of the finished product.

According to my invention, leather, whilst immersed in tanning liquor, is caused to bend repeatedly from end to end, by being guided over and around appropriately positioned rollers disposed one above another in two opposed series at opposite sides of a tanning liquor tank and to be straightened out by being supported on and by, conveyor bands, arranged to move between said rollers for controlled periods of time; the primary object of such treatment being to eject tanning liquor from the leather during the bending of same, and for fresh liquor to be re-absorbed into the leather during those periods when it is in an unflexed condition.

As the absorption of liquor by the leather whilst in its unflexed state is, to a large extent, an unforced process—as opposed to the forced ejections of liquid consequent upon the bending of the leather—and is dependent upon the absorbent properties of the leather itself, an important feature of the invention is the time control of those periods during which the leather is in a straight and unflexed condition. This time control may be achieved in various ways, as, for example, by varying the distance between the rollers over and around which the leather is guided and/or by varying the speed at which the leather is passed around the apparatus; and in a preferred embodiment it is arranged for the apparatus to be driven at a speed which becomes progressively slower as the treatment proceeds, thus gradually prolonging the periods during which the leather is in an unflexed state.

When leather is so treated, experiment has shown that during the early stages of a tanning operation, tanning liquor is ejected or squeezed from the leather from the concave side—whether grain or flesh—of a bend by compression of the fibres on that side only, and, therefore, in most cases, it is desirable that the leather be bent alternately from one side to the other. Also, the only periods of time during which tanning liquor is able to penetrate to the middle of the leather (to any appreciable extent) are those which exist between the bending actions. Therefore, the flexing or bending periods provided by my apparatus are multiplied initially to a maximum for each side of each individual piece of leather, and, if, for example, a maximum degree of tanning is required throughout the thickness of the leather, the non-flex periods are so controlled and are of such duration that sufficient time is permitted for the leather to absorb liquor to its maximum capacity—as far as is practicable—during each of said periods. The depth to which tanning liquor may penetrate to the interior of the leather and the degree to which the tanning process is carried out may thus be controlled by lengthening or shortening the non-flex periods of absorption. It is to be noted that the time taken for the flexing periods is comparatively unimportant.

I will further describe my invention with the aid of the accompanying sheets of explanatory drawings which illustrate, by way of example only and not of limitation, one mode of embodiment.

In said drawings:

Fig. 1 is a, more or less diagrammatic, side view in section of leather flexing apparatus, and Fig. 2 is a part-sectional end view of Fig. 1.

Fig. 3 is a fragmentary plan drawn to an enlarged scale as compared with the preceding views, showing a piece of leather secured between the endless chains of the apparatus.

Fig. 4 is a perspective view of one end of a roller with conveyor and endless chain, and Figs. 5 and 6 are plan and elevation, respectively, of one end of a leather holding batten in chain-engaging position.

Figs. 7 and 8 are elevation and plan views respectively of a means whereby the apparatus is driven at controlled speeds.

Figs. 9 and 10 are views drawn to an enlarged scale as compared with the preceding views and at right angles to each other showing parts of the transmission means.

Referring now to said drawings, I denotes a tanning pit—or its equivalent—wherein are provided, being journalled in a supporting frame 2, two series of rollers, the rollers of one series being generally designated 3, and the rollers of the other series 4. Rollers 3 are disposed adjacent to the side Ia of pit I, and rollers 4 adjacent to the opposite side Ib of said pit: each opposed pair 3, 4 of said rollers carries an endless conveyor band 5 of open mesh fabric the edges whereof are provided with locating strips 6 of, say, rubber, or other suitable material, adapted to engage within circumferential grooves 7 of rollers 3, 4 in order to prevent lateral movement or "creep'" of conveyors 5 during the operation of same. Sprocket wheels, generally designated 8, are fitted to each end of the uppermost pair of rollers 3, 4 also at each end of the last but one pair of rollers, and to the ends of alternate rollers of the intervening pairs; and a pair of endless chains, 9, 9 are arranged to work over said sprockets 8 whereby said chains follow a zig-zag travel path from top to bottom of pit 1, and from whence vertically upwards from bottom to top, as indicated by the chain-dot lines in Fig. 1.

Rollers 3 are each fitted at each end with a spur wheel 10, and said spur wheels mesh one with another so that when the uppermost roller 3 is rotated, by means of a power unit and driving mechanism as hereinafter described with reference to Figs. 7 to 10 inclusive, through a sprocket 11 and spur wheels 12, 13, adjacent rollers—and consequently conveyors 5—are driven at the same speed but in opposite directions.

A piece of leather 14 (Fig. 3) to be treated is first secured by cords 15 to a batten 16 of wood, or other suitable material which is provided at each end with a metal component 17 slotted as at 17a. The leading edge of batten 16 is provided with serrations 16a adapted to prevent lateral displacement of cords 15 when they are looped around batten 16 and fastened through holes 14a punched in the leather. Said chains 9, 9 are provided at intervals along their length with link plates whereon are formed pairs of lugs 18 which carry pins 19, the pins 19 of one chain 9 being located opposite to the pins of the other chain. The slots 17a of end components 17 of batten 16 are adapted to be engaged with opposed pairs of pins 19—being restrained from accidental displacement by springs 20—and thus, when the apparatus is set in motion, said leather will follow the path of chains 9, 9 as indicated by arrows in Fig. 1. To fully load the apparatus it is only necessary to bring pairs of attachment pins 19, one at a time, into required position for the engagement therewith of leather-holding battens 16.

It is to be noted that in its travel path the leather is flexed from end to end—by reason of it being confined between adjacent conveyor bands—first in one direction and then the other as it is guided by chains 9, 9, over rollers 3, 4, and after passing around one roller it is carried (as distinct from being pulled or dragged) in a substantially straight and unflexed state across pit 1 to the next roller, it being supported by conveyor bands 5, which latter, by reason of their meshwork construction permit substantially unimpeded access of the tanning liquor—with which the pit is filled to required depth—to the leather supported thereby.

The means whereby the apparatus is operable at a gradually decreasing speed, (see Figs. 7 to 10 inclusive) includes an electric motor 21 the driving pulley 22 whereof is connected by a belt drive 23 to one side of a variable speed pulley arrangement generally designated 24 and regulatable in known manner by means of a lever 25. Said variable pulley 24 is connected by a belt drive 26 to a pulley 27 on the input shaft 28a of a worm reduction gear unit 28 wherefrom the drive for the apparatus is taken via a sprocket 29 on shaft 28b. Sprocket 29 is connected by a chain drive (not shown) to sprocket 11 (Fig. 2) of the leather flexing apparatus.

Lever 25 is automatically operated by means of a rod 31 which connects said lever 25 to a half-nut 32 in operative engagement with a screw-threaded traversing rod 33 journalled in bearings 34, 34. Rod 33 is rotatable at slow speed by electric motor 21 through a variable speed transmission system of link operated pawls and ratchet wheels, whereby differing gear ratios may be interposed between said electric motor 21 and the transvering rod 33. The transmission mechanism between motor 21 and rod 33, comprises a variable eccentric, or crank, 35 turned by motor 21 through a conventional worm gear reduction unit 36, and to which eccentric 35 is pivotally connected one end of a link 37, the other end 37a whereof is pin-jointed by a pin 38 to a second link 39 pivotal on a lay-shaft 40. A ratchet toothed wheel 41 is secured on said lay-shaft adjacent to said second link 39 and a pawl 42, influenced by a spring 42a, is pivoted by a pin 43 to said second link 39 and engages the teeth of wheel 41 so that on rotation of the eccentric 35, oscillation of the connected links 37 and 39 causes pawl 42 to rotate ratchet wheel 41 (and so the lay shaft 40) step by step.

In a similar manner, a second adjustable eccentric 44 mounted on lay shaft 40 is arranged to actuate, through links 45 and 46 and a pawl 47 with spring 47a, a second ratchet wheel 48 which is secured on, and rotates, the transversing rod 33.

It will thus be seen that the rotational speed of traversing rod 33 will be considerably slower than that of the main drive from motor 21 and may be varied at will be adjusting the throw of the eccentrics (or cranks) 35, or/and 44 so that the number of ratchet teeth engaged by the respective pawls is varied. In order to permit further variation in speed, the point of pivotal connection between adjacent links may be adjustable, for example, by means of a slot 46a in link 46 wherethrough passes pivot pin 49 connecting links 45 and 46.

Said half-nut 32 is maintained in operative engagement with traversing rod 33 by means of a guide bar 50 with handle 50a, pivotally mounted at 51 and having a longitudinal slot 50b wherein is adapted to work a lateral projection 32a of half-nut 32. The pivotal mounting of the guide bar 50 permits half-nut 32 to be disengaged from traversing rod 33 in order that it may be moved by hand to any desired position on rod 33.

Said variable speed pulley 24 of said driving unit is of conventional twin belt type having two fixed outer flanges, designated 24a, 24b, and a movable centre flange 24c associated with the control lever 25 which alters the speed of the main drive to the rollers and automatically maintains the two belts 23 and 26 at constant tension.

In operation, and assuming electric motor 21 to be running, the traversing rod 33 of the control unit is slowly rotated through the described ratchet and link mechanism, so causing the half-nut 32 to be moved gradually along said rod. Control lever 25, by virtue of its connection with half-nut 32 is thus slowly moved, to cause an increase in the diameter of that portion of variable pulley 24 wherewith the driving belt 23 is connected, and a decrease in the speed of the drive.

It will, of course, be appreciated that by utilizing a traversing rod with a screw-thread of opposite hand, the described control means can be utilised to increase the speed of rotation.

The whole of the driving and control mechanism is conveniently mounted as a unit upon a base frame 52.

It will, of course, be understood that those parts of the apparatus in contact, or likely to be in contact, with the tanning liquor will be constructed of materials suitable for the purpose.

What I claim as my invention and desire to secure by Letters Patent is:

1. Apparatus for the tanning of leather comprising in combination, a plurality of rollers journalled in a supporting frame and disposed one above another in two opposed series at opposite sides of a tanning liquor containing pit, an endless horizontal conveyor band carried by and in respect of each opposed pair of said rollers, sprockets fitted at each end of certain rollers, a pair of endless chains arranged to move over and mesh with said sprockets whereby said chains follow a zig-zag travel path from top to bottom of the pit and from thence vertically upwards from bottom to top of the pit, lugs and attachment pins on certain link plates of said endless chains, battens having slotted end components for engaging with the attachment pins of said chains and to which battens pieces of leather to be tanned are secured, and means for actuating said apparatus automatically at controlled and gradually decreasing speeds.

2. Apparatus for the tanning of leather as claimed in claim 1, wherein the ends of each of one series of rollers are fitted with spur wheels which mesh one with another for driving adjacent rollers in opposite directions and at equal speeds, and whereby each endless conveyor band moves in a direction opposite to the conveyor bands immediately adjacent thereto.

3. Apparatus for the tanning of leather as claimed in claim 1, wherein each conveyor band is of open mesh fabric and has locating strips at each edge for engagement within circumferential grooves formed in the rollers carrying said conveyor bands.

EVAN GEORGE WILSON.

No references cited.